US007015969B2

(12) United States Patent
Brown et al.

(10) Patent No.: US 7,015,969 B2
(45) Date of Patent: Mar. 21, 2006

(54) HAND-HELD IMAGE CAPTURE APPARATUS WITH SCANNING ARRANGEMENT

(75) Inventors: Barry Allen Thomas Brown, Bristol (GB); Colin Stephen I'Anson, Bristol (GB); Weng Wah Loh, Bristol (GB); Andrew Dudley Morgan, Bristol (GB); Kenton Paul Anthony O'Hara, Bristol (GB); Christopher Gwyn Romans, North Somerset (GB); Abigail Jane Sellen, Newbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 893 days.

(21) Appl. No.: 09/729,704

(22) Filed: Dec. 6, 2000

(65) Prior Publication Data

US 2002/0067520 A1 Jun. 6, 2002

(30) Foreign Application Priority Data

Dec. 7, 1999 (GB) .................................... 9928784

(51) Int. Cl.
*H04N 5/225* (2006.01)
*H04N 5/76* (2006.01)

(52) U.S. Cl. .................................... 348/373; 348/231.3

(58) Field of Classification Search ........ 348/373–376, 348/231.5, 231.4, 333.05
See application file for complete search history.

(56) References Cited

U.S. PATENT DOCUMENTS 4,821,118 A * 4/1989 Lafreniere .................. 348/156
4,933,976 A * 6/1990 Fishbine et al. ............ 382/127
5,138,460 A * 8/1992 Egawa ....................... 348/239
5,467,403 A * 11/1995 Fishbine et al. ............ 382/116
5,708,515 A * 1/1998 Nishiura ..................... 358/473
5,815,759 A * 9/1998 Tseng et al. ................ 396/541
5,903,706 A * 5/1999 Wakabayashi et al. ...... 386/117
5,930,544 A * 7/1999 Tseng et al. ................ 396/529
5,936,609 A 8/1999 Matsuoka et al.
6,011,860 A * 1/2000 Fujieda et al. .............. 382/126
6,097,431 A * 8/2000 Anderson et al. ........ 348/231.7
6,266,090 B1 * 7/2001 Tseng et al. ................ 348/335
6,445,417 B1 * 9/2002 Yoshida et al. ............. 348/374
6,462,778 B1 * 10/2002 Abram et al. ............... 348/239
6,633,332 B1 * 10/2003 Nay et al. ................ 348/220.1
6,665,008 B1 * 12/2003 Silverbrook ................ 348/239
6,697,117 B1 * 2/2004 Park ........................... 348/373

FOREIGN PATENT DOCUMENTS

WO WO 96/27257 9/1996

* cited by examiner

*Primary Examiner*—Wendy R. Garber
*Assistant Examiner*—Timothy J. Henn
(74) *Attorney, Agent, or Firm*—Foley & Lardner LLP

(57) ABSTRACT

An image capture apparatus has a combined electronic camera and swipe scanner. The electronic camera has an optical system and detector array for remote capturing of a first image. The swipe scanner has an optical system and detector array for swipe capturing of a second image. The image capture apparatus further has a data storage arranged to store the first image and the second image in association with each other. The electronic camera may be a moderate resolution color camera, and the swipe scanner may have a grey-scale detector array capable of scanning an object at a higher resolution than the camera. A display is provided so that both images can be viewed separately in association with each other, or combined into a combination image, which has color information from the camera to colorize higher resolution pixels from the scanner.

14 Claims, 2 Drawing Sheets

HAND-HELD IMAGE CAPTURE APPARATUS WITH SCANNING ARRANGEMENT

BACKGROUND OF THE INVENTION

1. Field of the Invention

The present invention relates to a hand-held image capture apparatus, and to a method of using such apparatus.

2. Description of the Related Art

Hand-held swipe scanners for capturing an image are well-known. Such a scanner typically has a linear array of photodetectors arranged behind an imaging system such as an elongate moulded plastic focussing element. The focussing element is swiped in contact or near-contact across an object to be imaged, for example a document, in a direction transverse to the linear photodetector array. Means are provided to detect the linear distance travelled by the scanner so that an image can be built up from data captured from the array as the scanner is swiped over the object being imaged. Usually, the scanner device has means by which images captured from laterally adjacent swipes can be stitched together. An example of such a scanner is described in patent document WO 96/27257.

The swipe scanner may have an in-built optical source to illuminate the object to be scanned in the region imaged by the detector array, for example a linear stripe of near infrared or visible radiation.

Conventional swipe scanners are able to scan documents at a speed of up to about 300 mm/s in the direction transverse to the detector array.

Most swipe scanners capture images not in colour but with a grey-scale. Although it may in principle be possible to devise a swipe scanner that would capture colours as well as a grey scale, there are a number of technical problems, such as the need to illuminate the object with white light, and to have additional detector elements for detecting different colours. This adds to the cost and complexity of the swipe scanner, particularly if it is desired to maintain a swipe capture speed comparable with grey-scale swipe scanners. As a result, most commercially available swipe scanners capture images only in grey-scale even though there is an increasing need for colour capture of images. Swipe scanners that do capture images in colour are expensive and have to be tethered to a portable personal computer for power and data transfer.

Another limitation of conventional swipe scanners is the relative difficulty of keeping track of what has been scanned. A particular image may be given a file name, but this may not be sufficiently memorable or convey sufficient information regarding the scanned image. Although it is in principle possible to incorporate other information entry means, such as a keyboard, with a hand-held scanner, this may be inconvenient owing to the lack of physical space on the device. A user of the device may also find it less than convenient to spend significant time entering such information, particularly when the time taken to swipe an image is small by comparison.

SUMMARY OF THE INVENTION

It is an object of the present invention to provide an image capture device that addresses these issues.

According to the invention, there is provided an image capture apparatus, characterised in that the apparatus comprises: a combined electronic camera and swipe scanner, the electronic camera having a first optical system and detector array for remote capturing of a first image and the swipe scanner having a second optical system and detector array for swipe capturing of a second image; and a data storage means arranged to store the first image and the second image in association with each other.

The electronic camera may be a conventional camera comprising a focusable lens and a two-dimensional photodetector array, suitable for imaging a remote object at some distance, for example 1 m, from the camera. In contrast, a conventional swipe scanner normally has a linear photodiode array with a simple non-focusable optical system that is placed in near contact or actual contact with an object to be imaged. Although means must be provided to calibrate the movement of the linear detector array, and preferably also to stitch together adjacent swipes, at a given resolution in terms of dots per unit length, for example dots per inch (dpi), a conventional swipe scanner is inherently less expensive than a conventional remote electronic camera when used to image a typical A4 size document, or other such object.

This is particularly the case when the electronic camera has a colour detector array, and the swipe scanner has a grey-scale detector array.

A user may use the image capture apparatus to capture complementary or related images using both the electronic camera and swipe scanner. For example, a document may contain colour photographs and black and white text.

The user may want to capture the photographs in colour at a moderate resolution, as well as capturing the text, or possibly portions of the photographs, in high resolution.

An economical conventional hand-held digital camera will capture a complete image of an A4 document with a resolution of under 100 dpi (about 4 dots per millimeter). This is significantly lower than that achievable with a flat-bed document scanner (about 600 dpi) or a hand-held grey-scale swipe scanner (about 300 dpi). The user may, however, use the combined electronic camera and swipe camera in such a way that the camera is used to capture areas having colour, while the swipe scanner is used to capture images of areas having fine resolution.

The data storage means may consist of any suitable fixed or removable data storage media, including a solid state memory or a magnetic disc. The storage may be transitory, as in a semiconductor random access memory, or longer term, as on a magnetic microdiskette or a memory card.

The data storage means could be remote from the combined electronic camera and swipe scanner, for example being connected via an a communications cable or infra-red line of sight link, but it is preferred if this is combined with the electronic camera and swipe scanner in a compact hand-held unit.

In general, the images once stored in association with each other should be retrievable from the data storage device also in association with each other. For example, a user may wish to send an email message with both images retained as separate attachments. Alternatively, if the apparatus is connected to a printer, both images may be recalled from memory and sent to the printer and printed off on a single sheet of paper. Usually, the images will be stored in a way such that both images could be extracted and used independently of each other if need be, even if the data is written to the data storage medium as a single file.

Optionally, the device may include means to override the feature by which images from the electronic camera and swipe scanner are stored in association with each other. For example, a user may wish to use just the electronic camera, or just the swipe scanner.

Optionally, a person may capture more than one image from either or both of the electronic camera and swipe scanner, with a plurality of images from one of these image capture devices being associated with at least one image from the other one of these image capture devices.

The electronic camera could be a video camera capturing a sequence of images following the first capture image, but for reasons of economy is preferably a still camera capable of taking a still image that is complementary to or related to the swipe-scanned image.

The apparatus will be most useful when it includes a display for displaying one or both of the images. The display is preferably combined in a single unit with the electronic camera, swipe scanner and data storage means.

The display may be arranged so that it is visible to a user of the apparatus and displays to the user the first image from the electronic camera when this image is to be captured. Such a display may also at the same time display an associated previously captured second image from the swipe scanner, so that the user can capture the images with a desired orientation with respect to each other when displayed on the display.

In a preferred embodiment of the invention, the apparatus includes means for combining in registration the images with each other to form a composite image that combines in at least a portion of the composite image colour from the first image with detail from the second image. This is particularly advantageous when the electronic camera achieves lower resolution than the swipe scanner. The higher resolution grey-scale pixels generated from the swipe scanner may then be coloured according to the colour of corresponding registered pixels from the electronic camera. In order to achieve the registration, the device may include a microprocessor programmed to identify and match pairs of image identification features in both the associated images.

Also in a preferred embodiment of the invention, the apparatus has data input means by which annotation data regarding the first image or the second image may be entered into the apparatus in association with the first image and/or the second image. Such annotation data may take any of several forms, depending on the type of data input means. Examples of data input means include: buttons or a keypad; an electronic scribble pad; or an audio microphone.

Also according to the invention, there is provided a method of using an image capture apparatus that has an electronic camera for remote capturing of a first image, a scanner for swipe capturing of a second image, and data storage means for storing the first and second images; comprising the steps of:

a) using the electronic camera to capture the first image and the swipe scanner to capture the second image; and b) storing the first image and second image in association with each other.

BRIEF DESCRIPTION OF THE DRAWINGS

The invention will now be described by way of example, with reference to the accompanying drawings, in which:

FIG. 1 shows a perspective view of an image capture device 1 that has in a single unit an electronic camera 2, a swipe scanner 4, and a colour liquid crystal display 6 having an (x,y) resolution of 320×240 pixels and a touch sensitive screen 7. The camera 2 has an objective lens 8 that images incoming light 10 onto a colour photodetector array 12. The lens 8 and detector array 12 are held within a cylindrical housing 14 in a top edge 16 of the device 1. The cylindrical housing 14 can be pivoted about an axis 18 that runs in the same direction as the top edge 16. The lens 8 in the cylindrical housing 14 therefore has a field of view 20 that can be pivoted 22 through more than 180° with respect to the device 1.

Figure 2:
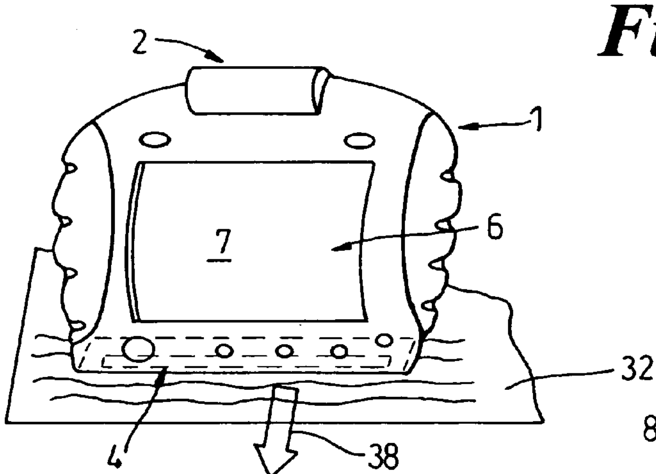
FIG. 2 is a view of the device being used to swipe-scan a document.

The swipe scanner 4 runs along a flat lower surface 24 of the device 1 in a direction parallel with the axis 18 of the camera cylindrical housing 14. The swipe scanner 4 has an elongate window 26 and behind this window within the device a linear array of light emitting photodiodes 28 that project visible light 30 outwards through the window 26. If, as shown in FIG. 2, the window 26 is in contact or near contact with an object to be scanned, for example a document 32, then visible light will be scattered by the object and returned 33 back through the window 26 onto a linear array of photodiodes 34 that runs parallel to the window 26. Swipe movement sensing means, for example a pair of infrared transmitter/receiver units 36 is provided on the flat lower face 24 of the device 1 so that when the device is swiped 38 across an object 32 to be imaged, changes in the intensity of the returned light 33 owing to scattering off surface features such as paper fibres can be detected and the resulting data used to construct an image of the swipe-scanned object 32.

Figure 3:
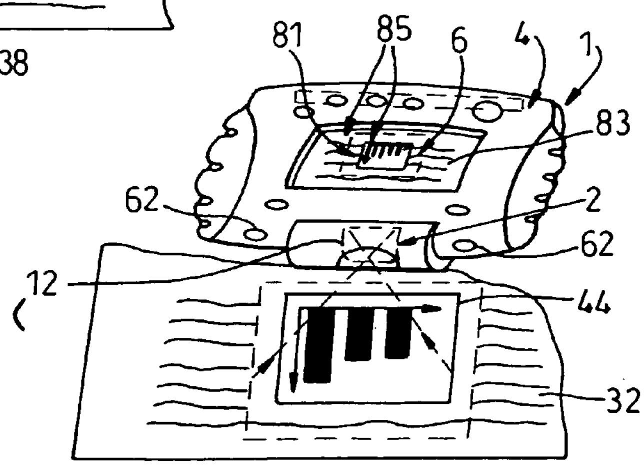
FIG. 3 is a view of the device's electronic camera being used to capture an image of a portion of the same document.

The display 6 can then display an image 38 of the swipe-scanned object, here an A4 document 32. In general such an image 38 may contain text 40 as well as graphical information, here a bar chart 42. The swipe scanner 4 images objects only with a grey-scale. The text 40 and bar chart 42 is therefore displayed on the colour liquid crystal display 6 only in black and white with a grey-scale. The bar chart 42 may, of course, be in different colours, but this cannot be captured by the swipe scanner 4. The electronic camera 2 can then be used as shown in FIG. 3 to capture a colour image of at least part of the document 32 including the bar chart itself 44. The captured image is then displayed as a colour image 46 on the colour display 6.

The device 1 has several control buttons arranged around the display 6, including: an on/off button 48 for the swipe scanner 4; a sliding activation button 50 for the electronic camera 2, which when depressed captures an image from the camera; a two-axis movement control button 52 that can be used to navigate menus displayed on the display 6 (not shown); and a variety of other buttons 54 that can be assigned other functions, for example manual focus or exposure correction.

The liquid crystal display 6 may be a touch-sensitive display 6 and additionally or alternatively be a scribble pad on which a user may write with a stylus 56 to enter hand written information 58 into the device 1. The hand written information 58 may be an annotation regarding the captured images 38,46. When the stylus 56 is not being used, it may be inserted into a recess 55 in the body of the device 1.

Optionally, the device 1 may have stereo microphones 62 along the top edge 16 for capturing audible information, for example background sound, or information dictated by the user, for example information relating to the images captured by the camera 2 and swipe scanner 4.

The device 1 preferably includes data output means, for example an internal modem (not shown) with an external telephone socket 57 to which a telephone line 59 may be connected. The modem can then be used to output from the device 1 data relating to associated images 38,46 from the electronic camera 2 and swipe scanner 4. Such output images may be associated with each other in some way, for example, both being combined into one image, or attached as file attachments to an electronic mail message.

The device 1 may be powered by removable batteries 61 accessible within a removable handgrip 63 when a handgrip release button 65 is pressed.

Figure 4:
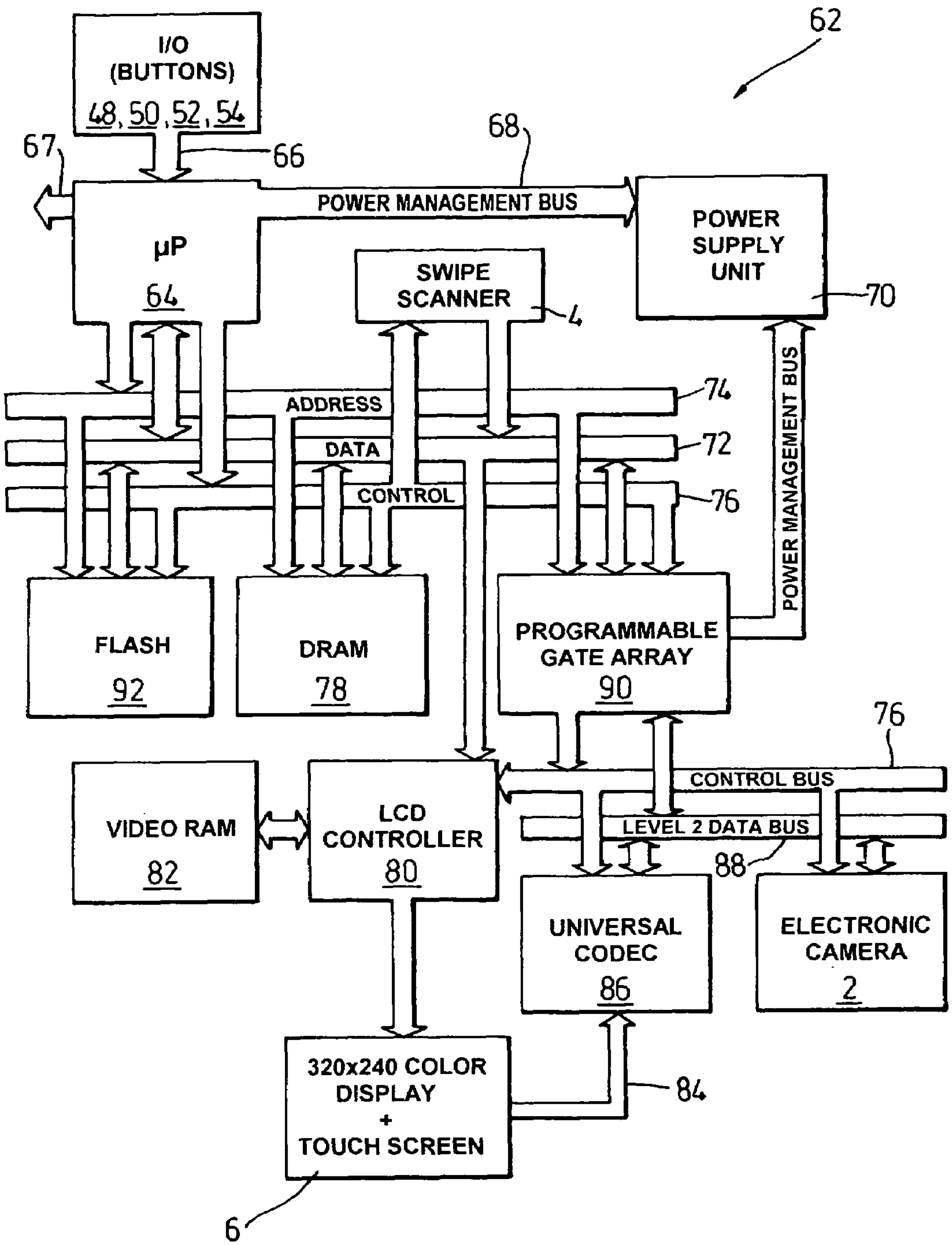
FIG. 4 is a schematic block diagram of various components of the device.

FIG. 4 shows a schematic block diagram 62 of the main data capture, storage and processing components of the device 1. A microprocessor (μP) 64 receives control inputs 66 from the various input/output (I/O) control buttons 48,50, 52,54. The microprocessor 64 controls the overall operation of the device 1 via a number of busses connected to the microprocessor, including: a power management bus 68 for a power supply unit 70; a main data bus 72; an address bus 74; and a control bus 76. The microprocessor is also connected to a data output line 67 by which data can be downloaded from the device 1, for example via an internal modem (not shown) and the telephone socket 57.

The control bus 76 is connected to the swipe scanner 4 so that the microprocessor 64 may control the capture of images by the swipe scanner 4. Data generated by the swipe scanner 4, including data from the movement sensors 36, is output by the swipe scanner to the main data bus 72 and received by the microprocessor 64, which then converts the data into image data representing an (x,y) array of image pixels. Included in this process is any necessary stitching together of data from adjacent swipes of the scanner 4.

The resulting image data can then be output from the microprocessor 64 onto the main data bus 72 to a dynamic random access memory (DRAM) 78 for temporary storage of the image data. The image data can also be sent on the main data bus 72 to a liquid crystal display (LCD) controller 80 connected to a video random access memory (video RAM) 82 that buffers the image data prior to the image data being output from the LCD controller 80 to the colour liquid crystal display 6.

The microprocessor 64 also controls other screen displays, such as help screens or control menus that a user may interact with by pressing highlighted areas of the display's touch-sensitive surface 7.

The touch-sensitive screen 7 has an analogue output 84 that sends data representative of (x,y) co-ordinates on the screen 7 activated by a user's touch, or by the stylus 56, to a universal coding and decoding (CODEC) circuit 86 that converts the analogue signals 84 from the touch screen 7 into digital signals. These digital signals are output from the universal CODEC 86 to a second data bus called a level-two data bus 88.

The electronic camera 2 also outputs data to the level-two data bus 88, and both the universal CODEC and electronic camera 2 are connected to the control bus 76 by which the microprocessor 64 can control the activity of the both the universal CODEC 86 and electronic camera 2.

A programmable gate array 90 is connected to both the level-two data bus 88, as well as to the main data bus 72, the address bus 74 and the control bus 76. Data received by the programmable gate array 90 from the universal CODEC 86 and the electronic camera 2 is processed by the gate array 90, and then output on the main data bus 72 to the microprocessor 64. Image data from the electronic camera 2 can then be stored in the DRAM memory 78, or sent to the LCD controller 80 for display on the liquid crystal display 6, as described above.

The programmable gate array 90 performs many specific functions in co-operation with the microprocessor 64. One of these is to act as a data buffer for continuous frame images generated by the electronic camera 2 prior to capture of one of the frame images as a still image.

A user of the device 1 can control the operation of the device either with the I/O buttons 48,50,52,54 or touch sensitive screen 7 to select images captured by the electronic camera 2 or swipe scanner 4 for longer term storage in a non-volatile memory, here a flash memory 92. When the images are stored in association with each other, the images will either be combined as a combination image, or stored separately but with additional data that permits the microprocessor to link the images when these are displayed or transmitted from the device 1.

Ways in which the device 1 may be used when capturing associated images from the electronic camera 2 and swipe scanner 4 will now be described.

In FIG. 3, the display 6 displays to the user a video image 81 from the electronic camera 2 when this image 81 is to be captured as a still picture. Here, the video image 81 is from the bar chart 44 of the document 32. The display 6 also displays at the same time an associated previously captured image 83 from the swipe scanner 4. Here, the previously captured image 83 is of a portion of the document 32. This allows the user can capture the images with a desired orientation with respect to each other when displayed on the display 6.

Here, the user has swipe-scanned some text on one portion of the A4 size document 32. This is then displayed on the display in conjunction with a "viewfinder" image 81 from the electronic camera 2. To make the scanned image 83 stand out, this might be highlighted in a pale bright colour, so that corresponding darker features from the viewfinder could be identified as the user aims the camera 2 to place the viewfinder image 83 in an appropriate orientation with the highlighted scanned image 81. This can be used to achieve at least a rough desired alignment between the images as these are captured and stored temporarily in the DRAM memory 78, or more permanently in the flash memory 92.

If it is desired to further register the images 81,83 with respect to each other so that corresponding areas overlap closely, then a final registration may be done automatically by the microprocessor 64 if this is programmed to identify corresponding image features in both images 81,83. In one mode of operation, a combination image 85 is formed using both images 81,83 by discarding the image data from the swipe scanner 4 in the area covered by the image from the electronic camera 2.

In another mode of operation, a combination image 85 is formed using overlapping data from both images 81,83. For example, colour information from the camera, for example of the bar chart 44, may be used to colourize higher resolution grey-scale pixels from the scanner of the same bar chart.

Figure 1:
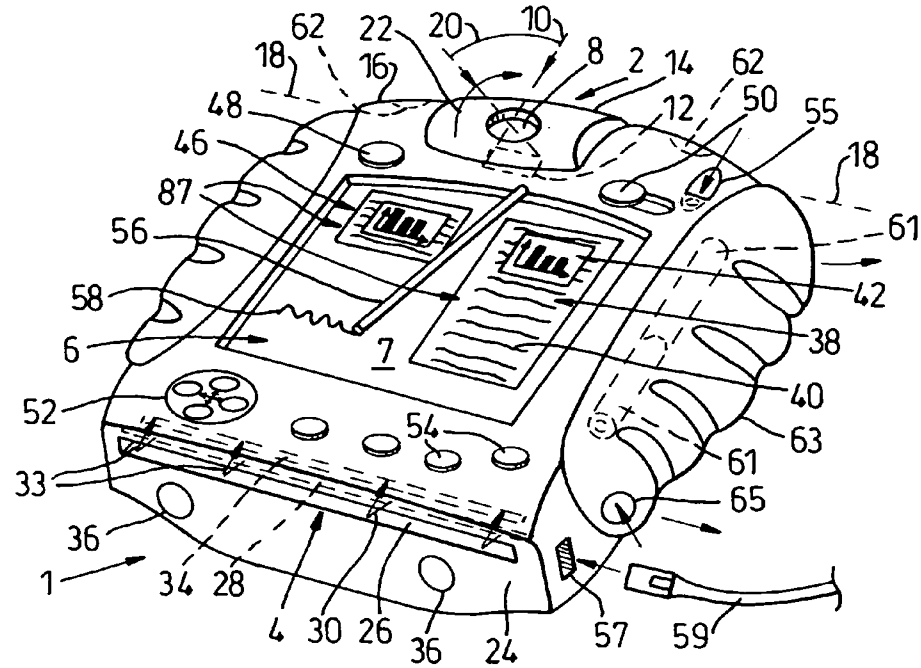
FIG. 1 is a perspective view of an image capture device according to the invention, comprising a combined electronic camera and swipe scanner with a display for displaying together images from the camera and swipe scanner.

Alternatively, the images 81,83 may be kept separate in a different type of combination image 87, as shown in FIG. 1. This may be useful if the device 1 is used to capture with the camera an image of a large white board with large scale writing or drawing. A scanned image of an A4 document with related information may be superimposed on a blank portion of the whiteboard image, such that the combination image contains useful information from both captured images.

The captured images are not limited only to textual or graphic information. A user could use the apparatus to capture an image of a person, and also to swipe-scan an image of the person's business card, and then store both images separately but together in a business card directory. When the associated business card related images are recalled, these associated images will be much more useful presented together, than either image would be on its own.

These examples show just some of the synergistic benefits that come from combining an electronic camera with a swipe scanner.

The invention claimed is:

1. An image capture apparatus comprising:

an electronic camera and a swipe scanner, wherein the electronic camera has an associated optical system and detector array for remote capturing of a first image, wherein at least part of the optical system and detector array is disposed in a pivotal housing configured to enable a field of view of the electronic camera to be pivotal through a predetermined angle with respect to a remainder of the image capture apparatus, and wherein the swipe scanner has an associated optical system and detector array for scan capturing a second image from a medium, the swipe scanner being configured to remain stationary relative to the electronic camera while moving relative to the medium; and a memory arranged to store the first image and the second image in association with each other.

2. An image capture apparatus as claimed in claim 1, in which the electronic camera captures colour images and the swipe scanner captures grey-scale images.

3. An image capture apparatus as claimed in claim 2, in which the apparatus includes a processor programmed for combining in registration the images with each other to form a composite image that combines in at least a portion of the composite image colour from the first image with detail from the second image.

4. An image capture apparatus as claimed in claim 1, comprising a display for displaying one or both of the images.

5. An image capture apparatus as claimed in claim 4, in which the display is visible to a user of the apparatus and displays to the user the first image when this is to be captured and at the same time also an associated previously captured second image, so that the user can capture the images with a desired orientation with respect to each other when displayed on the display.

6. An image capture apparatus as claimed in claim 4, in which the apparatus is adapted for displaying separately at the same time both the captured first image and the captured second image.

7. An image capture apparatus as claimed in claim 1, in which the apparatus has a data output arranged to output from the apparatus data representing the first image and the second image in association with each other.

8. An image capture apparatus as claimed in claim 1, in which apparatus has a data input by which annotation data regarding the first image or the second image may be entered into the apparatus in association with the first image and/or the second image.

9. An image capture apparatus as claimed in claim 8, in which the data input includes an electronic scribble pad.

10. An image capture apparatus as claimed in claim 8, in which the data input includes a keypad.

11. An image capture apparatus as claimed in claim 8, in which the data input includes an audio microphone.

12. An image capture apparatus as claimed in claim 1, wherein the predetermined angle is more than 180 degrees.

13. An image capture apparatus as claimed in claim 1, wherein the pivotal housing is cylindrical which pivotal about an axis.

14. A method using an image capture apparatus that has an electronic camera for remote capturing of a first image, a swipe scanner configured to remain stationary with respect to the electronic camera while moving relative to a medium for scan capturing of a second image from the medium, and a memory data storage means for storing the first and second images; comprising:

a) using the electronic camera to capture the first image and the swipe scanner to capture the second image;

b) storing the first image and second image in association with each other; and c) pivoting a housing in which at least a part of the electronic camera is disposed, to vary a field of view of the electronic camera with respect to a remainder of the image capture apparatus.

* * * * *